J. C. MORRELL.
PROCESS OF CLEANSING FINELY DIVIDED MATERIAL.
APPLICATION FILED MAR. 22, 1919.
1,359,091.
Patented Nov. 16, 1920.
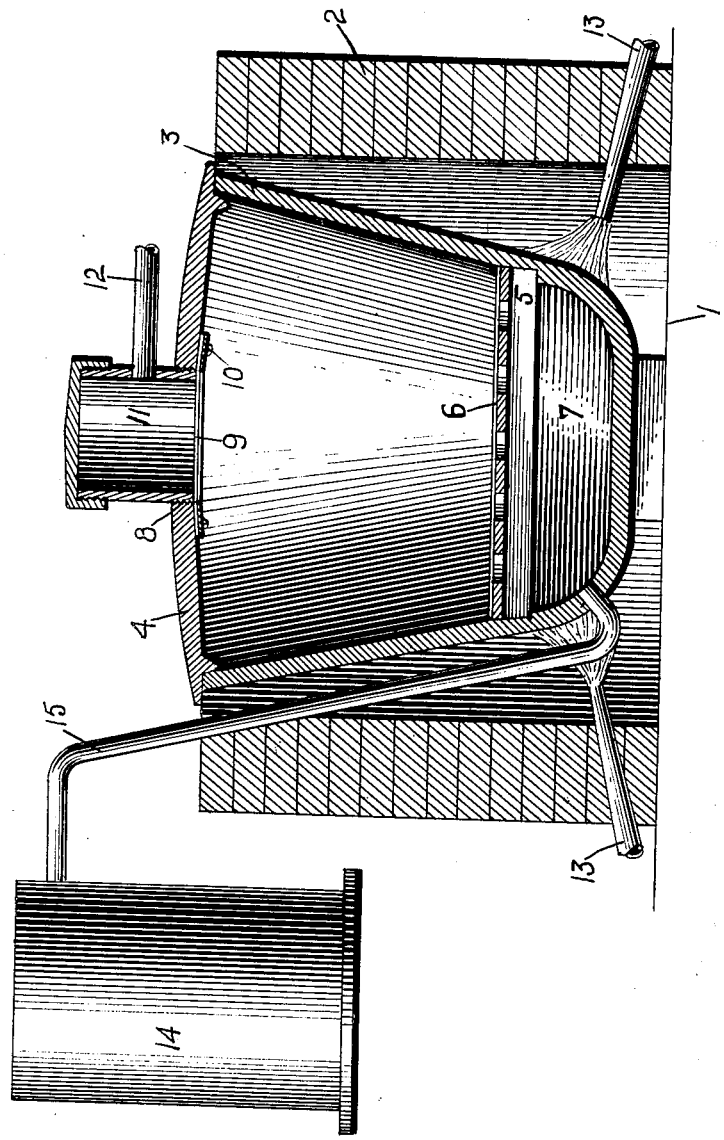

UNITED STATES PATENT OFFICE.

JACQUE CYRUS MORRELL, OF NEW YORK, N. Y.

PROCESS OF CLEANSING FINELY-DIVIDED MATERIAL.

1,359,091.   Specification of Letters Patent.   Patented Nov. 16, 1920.

Application filed March 22, 1919. Serial No. 284,460.

*To all whom it may concern:*

Be it known that I, JACQUE C. MORRELL, a citizen of the United States, and residing at New York city, have invented certain new and useful Improvements in Processes of Cleansing Finely-Divided Material, of which the following is a specification.

This invention relates to the cleansing of finely divided solids such as carbon black and infusorial earth, which contain volatile impurities such as oils, etc. It is among the objects of this invention to provide a process and apparatus for cleansing which is simple, efficient, results in a product far superior to that from other processes and is adapted to large scale manufacture.

Finely divided materials of various kinds are used as the basis in the manufacture of purifiers, absorbents, decolorizers, pigments, etc., in the production of a variety of substances such as illuminating gas, sugar, oils, paints, pigments, inks, etc. The activity of such material is dependent on the state of subdivision and the freedom from impurities, and my invention contemplates the purification of these materials in a novel manner. Preferably, I perform this purification while the material is in a finely divided state, since the cleansing operation can be made more effective at this stage than when the material has been consolidated into an aggregate of proper size for use, a process for accomplishing which is described and claimed in my co-pending application, Serial No. 284461, filed on concurrent date herewith. Hitherto, roasting or solvents were employed for this purpose, but processes of this kind are costly, unreliable, and inefficient.

In carrying the objects of this invention into effect, I confine the material to be cleansed of impurities in a chamber and pass a heated gas through the material which is held at an elevated temperature. The impurities are volatilized and decomposed, the vapors formed pass off, and may be condensed. The gas used should be of such a nature that it does not react to a great extent with the material being cleansed at the temperatures utilized and I have found that steam is well adapted for most materials.

My invention is particularly adapted for removing oils from finely divided carbon black, even the best grades of which contain large quantities of hydrocarbon oils adsorbed upon the surfaces of the particles. The individual particles of carbon black are extremely fine and in a microscopic state of sub-division. To insure its absolute cleanliness an apparatus and method have been devised to subject it to steam treatment despite the technical difficulties involved in its being one of the most finely divided materials known. The temperature at which this operation is carried on is comparatively low (450 to 600° C.) and the loss by oxidation is practically negligible.

The accompanying drawing illustrates an apparatus capable of carrying out my invention. A gas heated furnace 1 contains the brick work 2 into which is set a large iron crucible 3 with a well fitting cover 4. Just above the bottom of the crucible is seated an iron plate 5, which is drilled with many holes and covered with monel metal filter cloth 6. The space 7 between the cap and bottom of the crucible serves as a chamber for the entering steam. A large hole 8 is drilled into the cover 4 of the crucible and is covered with a monel metal filter cloth 9 held in place by a metal washer 10 which retains the carbon black while allowing the steam to escape into chamber 11 and through outlet 12. The products of distillation along with the steam may either be condensed after leaving the upper chamber or allowed to escape. The furnace is fitted with a ring of blast lamps 13 for the heating of the crucible. Steam is furnished by an ordinary steel boiler 14 and the conducting pipe 15 is passed through the heated zone to superheat the steam. Preferably, a coil is provided in the steam conduit to provide a more efficient superheating.

The carbon is placed upon the perforated iron plate which is covered with the metal filter cloth, the crucible is entirely filled and the cover clamped down. The filter cloth on the cover prevents the steam from carrying carbon black through the upper chamber and through the exit pipe. The flow of steam can be easily regulated by a condenser, although ordinarily a steady flow of steam will be satisfactory. I have found that the best temperature for this operation is between 450° C. and 600° C., for a period of from three to four hours.

Although I have described specifically the cleansing of carbon black, it is to be understood that my invention is not limited to the purification of this material, but similar carbonaceous material such as lamp black, ground coke, coal, charcoal, and graphitoidal carbons, and various earths such as fullers' earth, Floridan, or infusorial earths may be purified by this process. I do not intend to limit myself to the use of steam, but other gases having the desirable characteristics may be substituted for the same. I also contemplate varying the temperature of purification and the period, the magnitude of these being dependent upon the character of the materials being treated and the purpose for which they are to be subsequently employed.

I claim:

1. In a process of cleansing materials in microscopic state of subdivision, distilling impurities therefrom by passing superheated steam through a mass of such material.

2. In a process of cleansing materials in microscopic state of subdivision, confining such material, heating to a temperature of 450–600° C. and distilling the impurities therefrom by passing superheated steam through the mass.

3. In a process of cleansing carbon in microscopic state of subdivision, distilling impurities therefrom by passing steam through a mass of such carbon.

4. In a process of cleansing carbon in microscopic state of subdivision, confining such carbon, heating to a temperature of 450–600° C. and distilling the impurities therefrom by passing superheated steam through the mass.

JAC CYRUS MORRELL.